United States Patent [19]
Mikkelsen

[11] Patent Number: 6,074,192
[45] Date of Patent: Jun. 13, 2000

[54] LENTICULAR PATTERN FORMING ROLL AND METHOD FOR MAKING THE ROLL

[76] Inventor: Öystein Mikkelsen, 104 Bit Ct., Kissimmee, Fla. 34743-6303

[21] Appl. No.: 08/928,006

[22] Filed: Sep. 11, 1997

[51] Int. Cl.[7] .......................... B29C 47/00; B29C 59/04; F28F 5/02

[52] U.S. Cl. .................... 425/327; 29/895.21; 29/895.3; 29/282; 264/1.6; 264/2.7; 264/284; 425/363; 425/377; 425/385; 492/46

[58] Field of Search .................................. 425/194, 325, 425/327, 363, 377, 385, 388, 810; 264/1.31, 1.33, 1.6, 2.7, 1.9, 106, 107, 284, 210.2; 29/895.21, 895.3, 282; 492/46

[56] References Cited

U.S. PATENT DOCUMENTS

| | | |
|---|---|---|
| 629,696 | 7/1899 | Liberty . |
| 1,288,643 | 12/1918 | Mayer . |
| 1,438,231 | 12/1922 | Goodenberger et al. . |
| 1,805,009 | 5/1931 | Ruth . |
| 1,952,038 | 3/1934 | Fischer et al. . |
| 2,468,585 | 4/1949 | Bluma et al. . |
| 2,585,424 | 2/1952 | Balthrop et al. . |
| 2,724,312 | 11/1955 | Gruetzner . |
| 2,750,631 | 6/1956 | Johnson et al. . |
| 2,964,251 | 12/1960 | Samuels et al. . |
| 3,241,429 | 3/1966 | Rice et al. . |
| 3,354,519 | 11/1967 | Jansen et al. . |

(List continued on next page.)

FOREIGN PATENT DOCUMENTS

| | | |
|---|---|---|
| 0 763 667 A1 | 3/1997 | European Pat. Off. . |
| 15 97 547 | 8/1970 | Germany . |
| 1146004 | 3/1969 | United Kingdom . |
| 1231063 | 5/1971 | United Kingdom . |
| 1269972 | 4/1972 | United Kingdom . |
| 1279641 | 6/1972 | United Kingdom . |
| 92/19809 | 11/1992 | WIPO . |
| 96/09154 | 3/1996 | WIPO . |

OTHER PUBLICATIONS

Patent Abstracts of Japan, vol. 006, No. 050 (M–120), Apr. 3, 1982, JP 56164826 (Dainippon Printing Co. Ltd.), Dec. 1981.

Patent Abstracts of Japan, vol. 006, No. 42, Mar. 16, 1982, JP 56159039 (Dainippon Printing Co. Ltd.), Dec. 1981.

Patent Abstracts of Japan, vol. 016, No. 282 (M–1269), Jun. 23, 1992, JP 04071897 (Dainippon Printing Co. Ltd.), Mar. 1992.

Patent Abstracts of Japan, vol. 016, No. 283 (C–0955), Jun. 24, 1992, JP 04074864 (Matsushita Electric Ind. Co. Ltd.) Jul. 1990.

Patent Abstracts of Japan, vol. 010, No. 044 (M–455), Feb. 21, 1986, JP 60196209 (Sumitomo Kinzoku Kogyo KK), Oct. 1985.

*Primary Examiner*—Mathieu D. Vargot
*Attorney, Agent, or Firm*—Allen, Dyer, Doppelt, Milbrath & Gilchrist, P.A.

[57] ABSTRACT

A lenticular pattern forming roll, used for forming a lenticular screen, includes a chill roll and a lenticular sleeve positioned on the chill roll. The lenticular sleeve has a lenticular pattern formed on an outer surface for forming a corresponding lenticular pattern in a plastic sheet. The sleeve may be readily manufactured and transported to a desired location to be installed on the chill roll. The lenticular pattern forming roll may be readily used in combination with an extruder for extruding a hot plastic sheet to form the lenticular screen. The sleeve may also be removed from the chill roll and transported for resurfacing and without requiring transporting of the chill roll. The lenticular sleeve may preferably comprise a nickel-phosphorous composition defining at least a radially outermost portion of the sleeve in which the lenticular pattern is formed. More particularly, the nickel-phosphorous composition is preferably an amorphous nickel-phosphorous composition comprising nickel in a range of about 75 to 86 percent by weight, and phosphorous in a range of about 14 to 25 percent by weight. The nickel-phosphorous composition may be formed by electrodepositing or electroless depositing. The lenticular sleeve may be slit and flattened to define a flat lenticular body for molding a lenticular screen.

68 Claims, 8 Drawing Sheets

U.S. PATENT DOCUMENTS

| | | | |
|---|---|---|---|
| 3,380,360 | 4/1968 | Stockbridge et al. | |
| 3,385,721 | 5/1968 | Leach | |
| 3,504,059 | 3/1970 | Glenn et al. | |
| 3,594,863 | 7/1971 | Erb | |
| 3,617,281 | 11/1971 | Lindin | |
| 3,683,773 | 8/1972 | Dudley | |
| 3,756,760 | 9/1973 | McBride | 425/363 |
| 3,810,729 | 5/1974 | Patchell | 264/284 |
| 3,966,383 | 6/1976 | Bussey, Jr. et al. | 264/284 |
| 4,193,959 | 3/1980 | Lemelson | 264/166 |
| 4,244,683 | 1/1981 | Rowland | 425/143 |
| 4,250,135 | 2/1981 | Orsini | 425/363 |
| 4,461,663 | 7/1984 | Tachibana et al. | |
| 4,604,156 | 8/1986 | Raley et al. | 264/154 |
| 4,726,871 | 2/1988 | Hüsges et al. | 156/389 |
| 4,787,837 | 11/1988 | Bell | 425/385 |
| 4,821,936 | 4/1989 | Osborn | |
| 4,844,766 | 7/1989 | Held | |
| 4,925,379 | 5/1990 | Bourelier | |
| 5,048,745 | 9/1991 | Sato et al. | 264/107 |
| 5,100,312 | 3/1992 | Wiener | 425/186 |
| 5,133,125 | 7/1992 | Diebels et al. | |
| 5,138,918 | 8/1992 | Attardi et al. | |
| 5,324,248 | 6/1994 | Quigley | |
| 5,330,799 | 7/1994 | Sandor et al. | 264/1.31 |
| 5,388,803 | 2/1995 | Baumgartner et al. | 249/111 |
| 5,524,342 | 6/1996 | Swain et al. | |
| 5,538,677 | 7/1996 | Takahashi | |
| 5,743,981 | 4/1998 | Lu | 156/275.5 |
| 5,781,830 | 7/1998 | Gaylord et al. | |

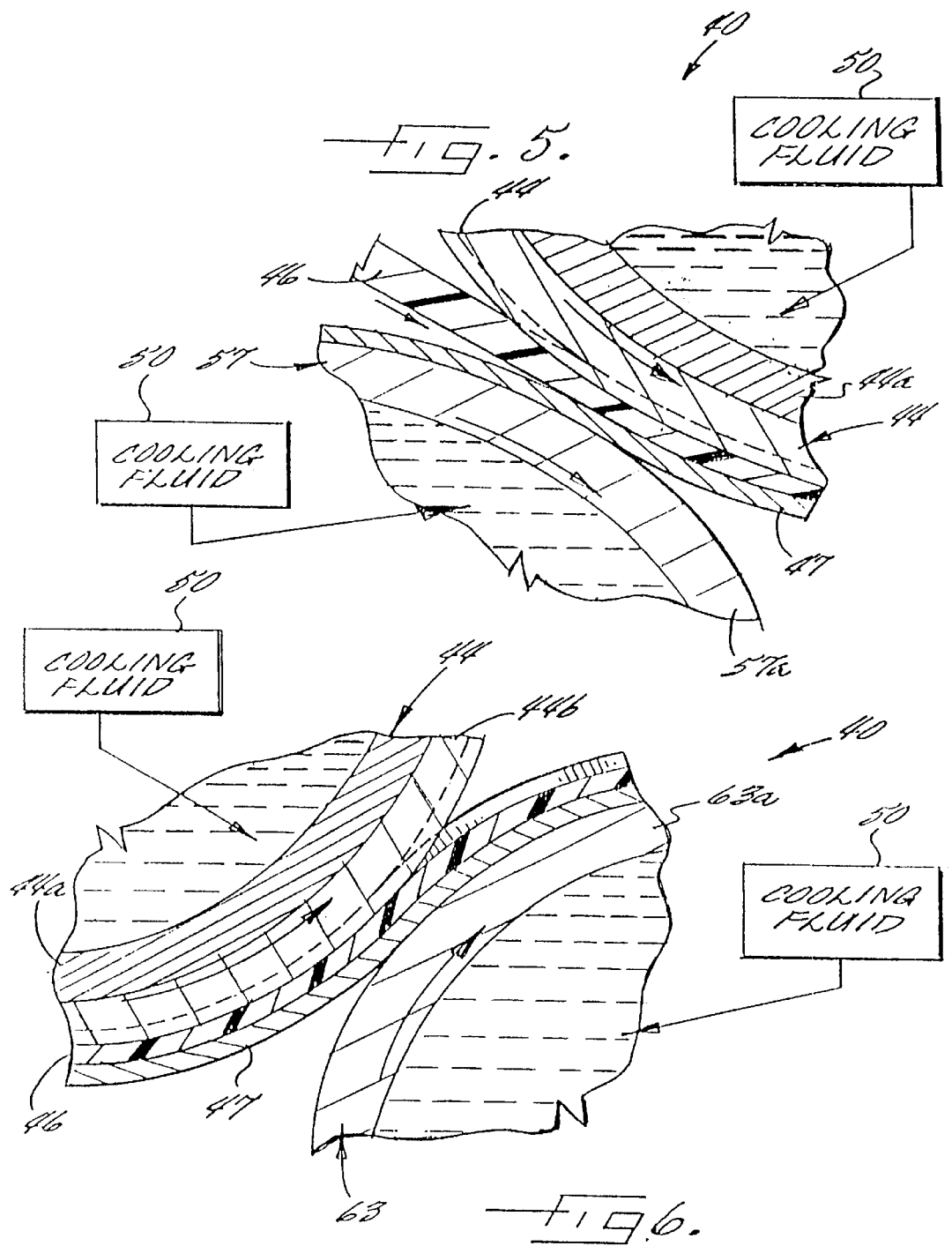

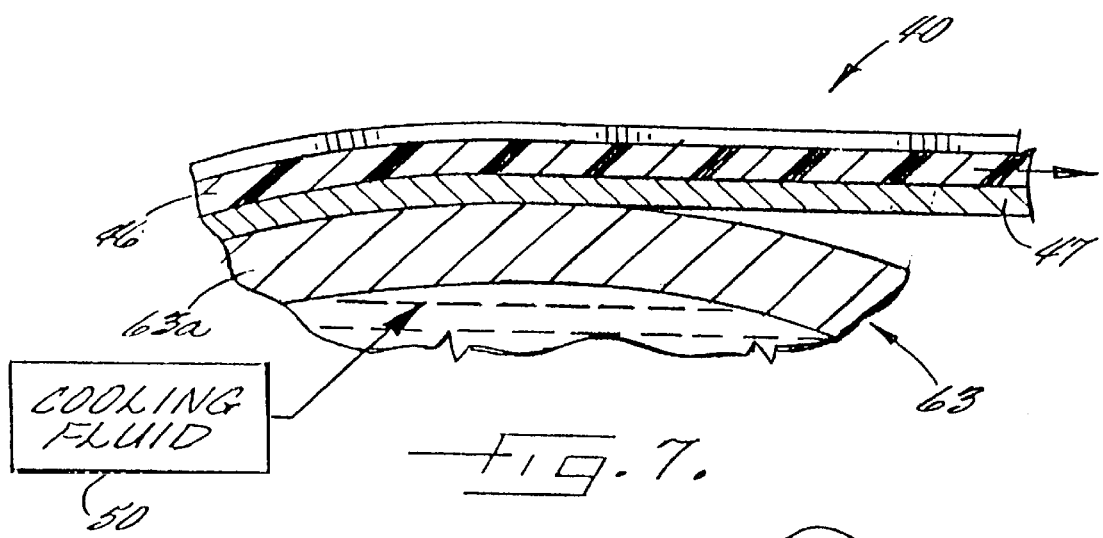
FIG. 7.
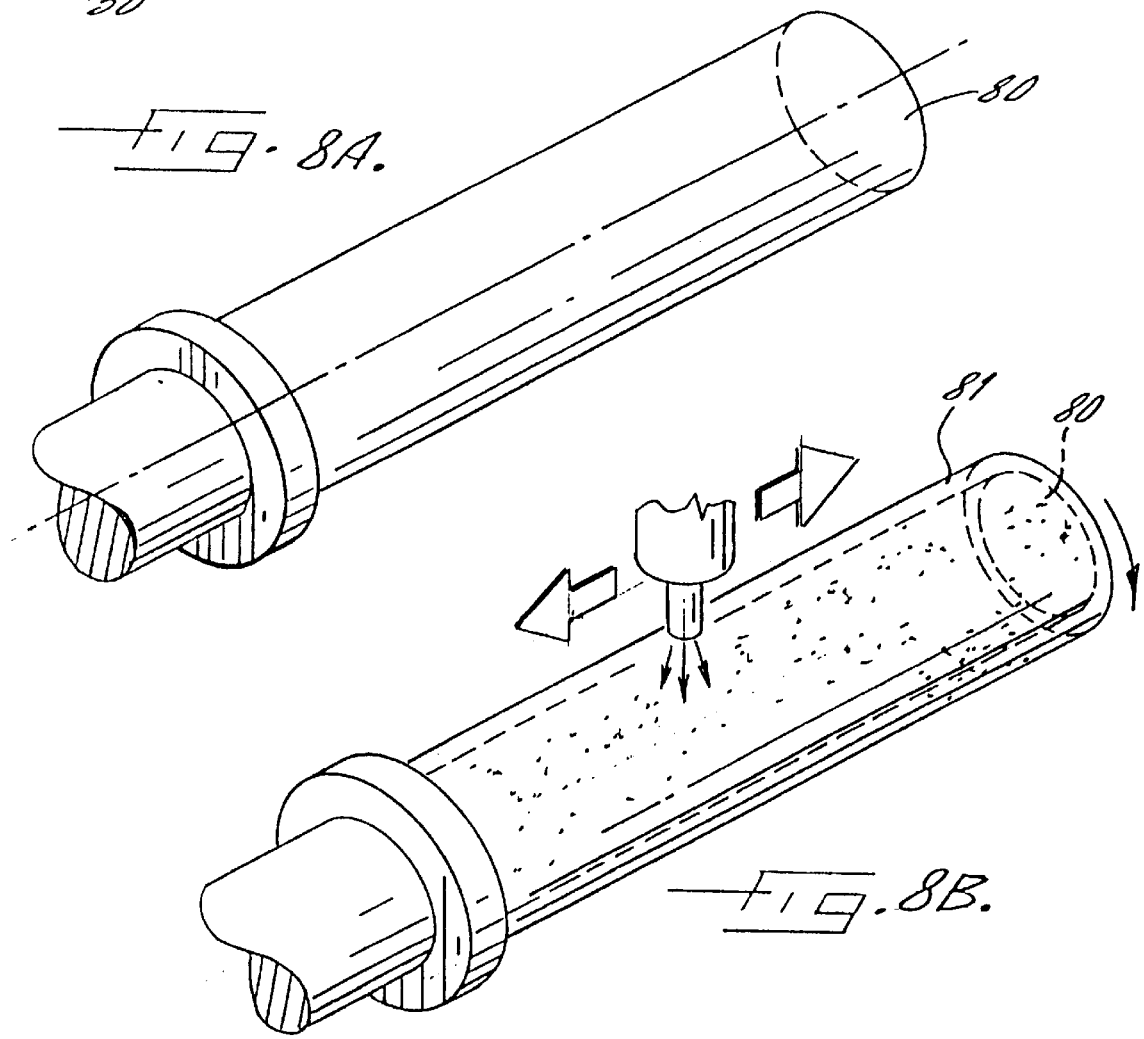
FIG. 8A.
FIG. 8B.

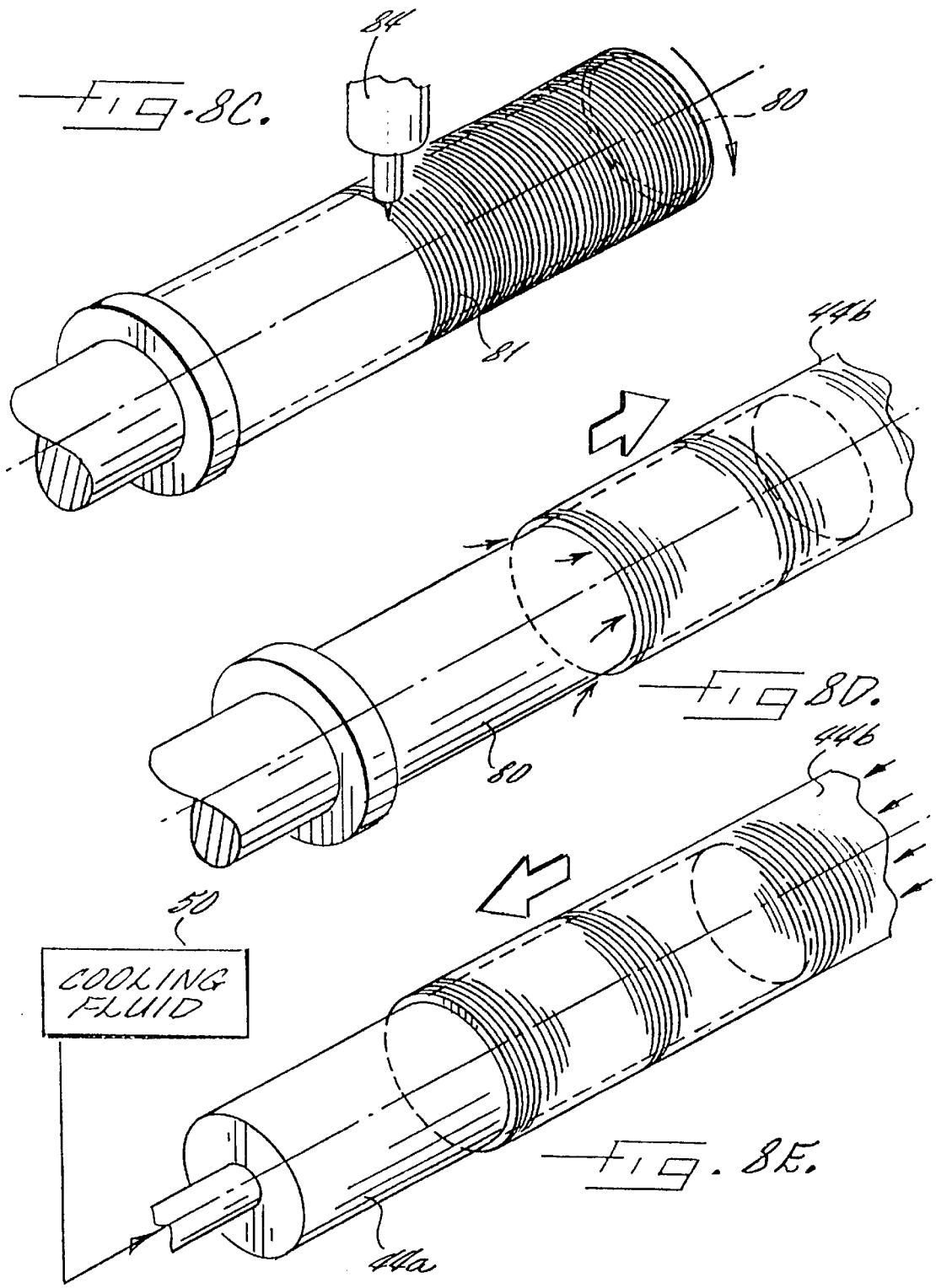

LENTICULAR PATTERN FORMING ROLL AND METHOD FOR MAKING THE ROLL

FIELD OF THE INVENTION

The present invention relates to machinery and methods for making plastic articles, and, more particularly, to an embossing roll and, such as for forming a lenticular pattern, and a method for making the roll.

BACKGROUND OF THE INVENTION

In lenticular imaging, an optical element called a lenticular screen is placed between an image and the viewer, as disclosed, for example, in U.S. Pat. Nos. 3,504,059 to Glenn, Jr.; 2,724,312 to Gruetzner; and 3,683,773 to Dudley. Lenticular screens are typically formed from a transparent plastic sheet with lenses integrally formed on only one side that focus on the opposite and typically flat side. The lenticular elements can have many shapes, such as, for example, cylindrical, angular, spherical, or shaped like cube corners.

The original lenticular image can be created photographically, electronically or by a combination of both. Images can be reproduced and mass produced using photosensitive materials, printed by lithographic means or by other means of printing or transfer of inks or dyes. Electronic displays, such as cathode-tubes or flat panel displays, may also be fitted with a lenticular screen if the resolution of the display is sufficient.

One known technique for manufacturing lenticular screens includes cutting the lenticular lens pattern directly into transparent plastic materials. A lenticular screen can also be formed by the casting of thermosetting resins onto flat forms including the lenticular lens pattern. In addition, a lenticular screen may also be made by thermoforming a cast or extruded transparent sheet by heat and pressure between one polished plate and one plate with the lenticular pattern cut or engraved into its surface. Injection molding may also be used to form a lenticular screen.

A lenticular screen may also be formed by extrusion of resin onto transparent pre-produced sheet or film, wherein the lenticular pattern is embossed into the resin by an embossing roll. The applied resin may then be cured by radiation through the transparent material while the web is in contact with the embossing roller. Alternately, if the properties of the resin permit, the resin may be cured by radiation after the sheet has left the embossing roll.

A lenticular screen may also be manufactured using a machine similar to that normally used for flat sheet extrusion. As disclosed in U.S. Pat. No. 2,724,312 to Gruetzner, for example, and as shown with reference to the prior art illustration of FIG. 1, such a machine 20 includes a sheet extruder 21 and a polishing stack 22. The polishing stack 22 illustratively includes three rolls 23, 24 and 25, wherein the middle roll 24 has the lenticular pattern on its outer surface. The upper roll 23 and lower roll 25 have a smooth outer surface. A plurality of small rolls 27 support the sheet 26, and a pair of pull rolls 28 pull the sheet from the polishing stack 22. This type of machine 20 and associated method are used for most of the lenticular sheet produced at present.

The lenticular image can be reproduced on the photographic material and thereafter be laminated to the lenticular screen. There are also applications where the photographic emulsion is coated onto the flat side of the screen. The lenticular image can also be printed with inks or dyes on a suitable material which, in turn, is laminated to the back of the screen or printed directly onto the flat side of the screen. Common for all the processes are that the lenticular image and the lenticular screen meet exacting tolerances to obtain the desired result.

The three roll polishing stack 22 is basically a simplified calendar. The polishing rolls 23, 24 and 25, are also known as chill rolls in flat plastic sheet production or as embossing rolls, if a pattern is cut or engraved into their surface. The functions of the rolls are to give the sheet, which initially is pre-formed by the sheet die at the end to the extruder 21, a more uniform gage, polish the sheet surface, transfer the pattern of the embossing roll to the sheet, and chill the material to a temperature lower than its softening point to keep the sheet in the shape formed by the rolls. The embodiment of the prior art machine 20' of FIG. 2 illustrates that the rolls 23', 24' and 25' can be arranged in a diagonal orientation. Of course a horizontal orientation is also possible.

Considering the arrangement of FIG. 1, if the three rolls in the stack 22 have one common motor drive, the upper roll 23 and middle roll 24 are held in position so they define a nip point therebetween. The lower roll 25 is held within a short distance to the middle roll 24, since the plastic is shrinking, and therefore the circumferential speed of the rolls needs to be differentiated. The plastic web 26 is taken away by the pull rolls 28 to keep the sheet in relative contact with the surface of the middle and lower rolls, but will also apply extra tension to the plastic web 26 as well. The tension caused by the pull rolls 28 will stretch the material.

In the case of individual drives for each of the rolls in the stack 22' shown in FIG. 2, the upper roll 23' can also form a nip with the middle roll 24'; however, its speed has to be slightly different to keep the plastic web 26' in contact with the middle roll. In addition, pull rolls, not shown, still have the task of keeping the plastic in contact with the upper roll 23'.

Unfortunately, in the prior art machines 20, 20' the sheet is held under pressure just in the nip between the first two rollers, and it is there that the lenticular lenses are created. The time the plastic sheet is under pressure in the nip will depend on the diameter of the rolls, the speed of the web and the thickness of the material. Even with larger diameter rolls, a thicker sheet, and at the speeds somewhat less than recommended to ensure proper flow through the extruder, the time period is relatively short. In fact, the time period is often too short to ensure proper reproduction of the lenticular pattern onto the plastic web. Downstream from this nip point, only the tensioning of the sheet enables contact of the sheet with the embossing roll. Or course, the contact is limited by the tension that can be applied to the still hot plastic either by the upper roll 23' (FIG. 2) or by the pull rolls 28 (FIG. 1).

The tensioning of the sheet can, for some materials that otherwise are suited for lenticular screens, cause a haze and/or make the sheet brittle. Excessive tensioning can result in stress that can be released even at temperatures lower than the softening point and cause the sheet to buckle. It is required, if the finished lenticular screen is to be optically acceptable, that the lenticular lenses in the plastic material replicate the pattern on the embossing roller as closely as possible.

In addition, the energy carried in the plastic sheet will have a significant negative effect on the valleys between adjacent lenses, and also on the lens curvature. Even with a relatively thin sheet, for example, having a thickness of about 0.4 mm, it can be difficult in a conventional polishing stack to obtain an accurate reproduction of the lens pattern. The thicker the sheet, the greater the problem with accurately reproducing the lenticular pattern. Some materials can, if cooled too quickly, leave a residue on the rolls, which if allowed to build up, would prevent the lenticular pattern from being accurately reproduced in the plastic. Accordingly, the machine is taken out of service and the residue removed, thereby resulting in a loss of production.

Yet another difficulty with conventional machines for making a lenticular screen is that production of the lenticular pattern forming roll itself is elaborate and costly. Lenticular screens can have a lens width, or pitch if the lens is cylindrical, smaller than 100 microns. One method of machining such fine and accurate lenses is by cutting the pattern into the outer surface of the roll with single crystal diamonds. The diamond tool can have a cutting edge which defines a radius or part of a sphere and which can be ground by conventional techniques or formed by chemical techniques. A common conventional technique for obtaining a hard lenticular pattern forming roll creates the pattern into the steel mantel of the roll and then applies a hard chrome plating for wear and corrosion resistance. Alternately, another material like copper is plated onto the mantel surface and the pattern is etched, engraved or cut in the copper, and thereafter the mantel is plated with hard chrome for wear resistance. The hard chrome surface itself can also be given a structure or pattern by etching or engraving.

Unfortunately, many of the conventionally used materials, such as steel, may cause considerable wear of the diamond cutting tool, and thereby increase the cost of forming the lenticular pattern. In addition, the entire lenticular pattern forming roll must be removed when worn, shipped to a remote site for refinishing, and transported back for re-installation. The roll is relatively bulky and, thus, costly to ship. In addition, the machine may be out of service while the roll is being refinished or replaced.

SUMMARY OF THE INVENTION

In view of the foregoing background, it is therefore an object of the present invention to provide a lenticular pattern forming roll having a construction which facilitates its manufacture and use.

It is another object of the invention to provide a lenticular pattern forming roll comprising a material for reducing the wear of cutting tools used for forming the lenticular pattern.

These and other objects, features and advantages in accordance with the present invention are provided by a lenticular pattern forming roll for forming a lenticular screen, and wherein the lenticular pattern forming roll comprises a chill roll and a lenticular sleeve positioned on the chill roll. The lenticular sleeve has a lenticular pattern formed on an outer surface for forming a corresponding lenticular pattern in a plastic sheet. The sleeve may be readily manufactured and transported to a desired location to be installed on the chill roll. Of course, the lenticular pattern forming roll may be readily used in combination with an extruder for extruding a hot plastic sheet to form the lenticular screen. The sleeve may also be removed from the chill roll and transported for resurfacing and without requiring transporting of the chill roll. The lenticular sleeve offers many other advantages including a relatively low cost compared to a chill roll having the lenticular pattern formed in its exterior surface.

The lenticular sleeve may preferably comprise a nickel-phosphorous composition defining at least a radially outermost portion of the sleeve in which the lenticular pattern is formed. More particularly, the nickel-phosphorous composition is preferably an amorphous nickel-phosphorous composition comprising nickel in a range of about 75 to 86 percent by weight, and phosphorous in a range of about 14 to 25 percent by weight. This material is durable in use, yet the lenticular pattern is readily formed in the composition using conventional diamond cutting techniques. In addition, the nickel-phosphorous composition may be formed by electrodepositing or electroless depositing.

The interior surface of the lenticular sleeve may have a predetermined diameter and interior surface finish to frictionally engage an adjacent exterior surface of the chill roll. When using the nickel-phosphorous composition, the interior surface of the lenticular sleeve will preferably have a coefficient of friction of at least about 0.1. A meltable adhesive may also be used to secure the lenticular sleeve to the chill roll.

One method aspect of the invention is for making a lenticular pattern forming roll for forming a lenticular screen. The method preferably comprises the steps of: providing a chill roll having a generally cylindrical shape for accepting a cooling fluid therethrough; providing a lenticular sleeve having a lenticular pattern on an outer surface thereof for forming a corresponding lenticular pattern in a plastic sheet passed adjacent thereto; and positioning the lenticular sleeve on the chill roll. The step of providing the lenticular sleeve preferably comprises the steps of: forming a metal layer on a mandrel; cutting the lenticular pattern in an outer surface of the metal layer while on the mandrel to form the lenticular sleeve; and freeing the lenticular sleeve from the mandrel. Another method aspect of the invention relates to forming the lenticular sleeve.

Another method aspect of the present invention is for making a body having a lenticular pattern thereon to be used for forming a lenticular screen. The method preferably comprises the steps of: forming a metal layer on a mandrel; cutting the lenticular pattern in an outer surface of the metal layer while on the mandrel to form the lenticular sleeve; and freeing the lenticular sleeve from the mandrel. In one embodiment the sleeve may be positioned on a chill roll. In another embodiment, the lenticular sleeve may be axially slit and flattened to define a flat lenticular form for molding a lenticular screen.

BRIEF DESCRIPTION OF THE DRAWINGS

FIG. 5 is a greatly enlarged cross-sectional view of the entry contact area of the plastic sheet with the lenticular pattern forming roll and conveyor belt in the apparatus as shown in FIG. 3.

FIG. 6 is a greatly enlarged cross-sectional view of the exit contact area of the plastic sheet with the lenticular pattern forming roll and conveyor belt in the apparatus as shown in FIG. 3.

FIG. 7 is a greatly enlarged cross-sectional view of the area where the conveyor belt and plastic sheet leave the lenticular pattern forming roll area in the apparatus as shown in FIG. 3.

FIG. 8A is a perspective view of a mandrel for forming a lenticular pattern forming roll in accordance with a method of the present invention.

FIG. 8B is a perspective view of the mandrel with a metal layer deposited thereon in accordance with the present invention.

FIG. 8C is a perspective view of the mandrel and metal layer deposited thereon wherein a lenticular pattern is being formed to define a lenticular sleeve in accordance with the present invention.

FIG. 8D is a perspective view of the mandrel and lenticular sleeve illustrating removal of the sleeve from the mandrel in accordance with the present invention.

FIG. 8E is a perspective view of the lenticular sleeve being installed onto a chill roll in accordance with the present invention.

DETAILED DESCRIPTION OF THE PREFERRED EMBODIMENTS

Figure 1:
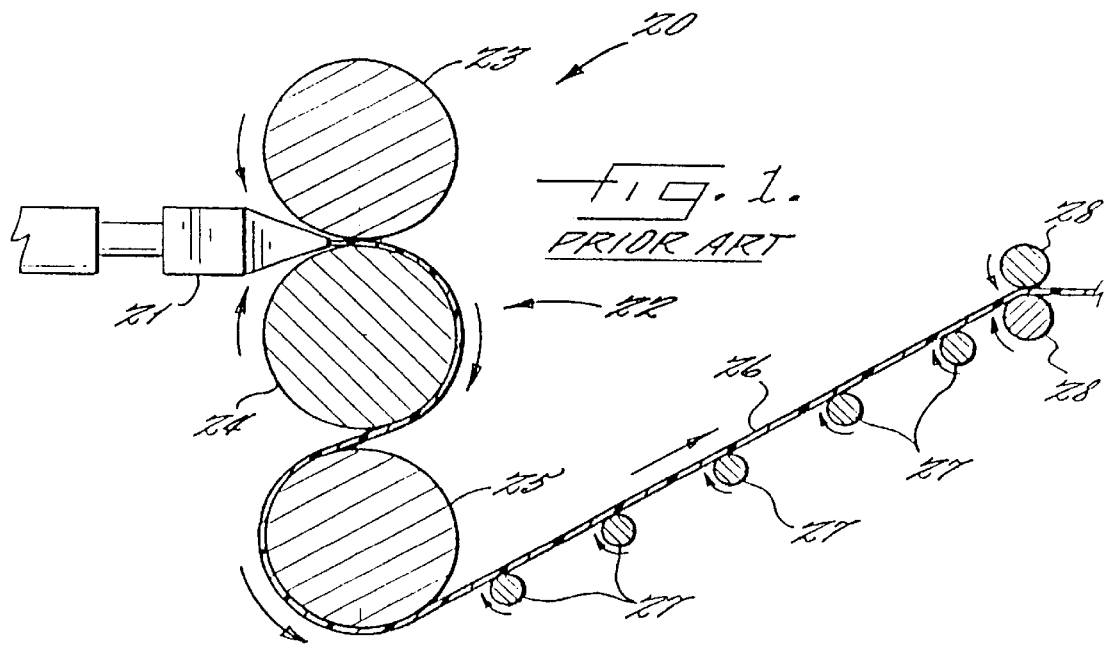
FIG. 1 is a schematic side cross-sectional view of an embodiment of an apparatus for making a lenticular screen in accordance with the prior art.
Figure 2:
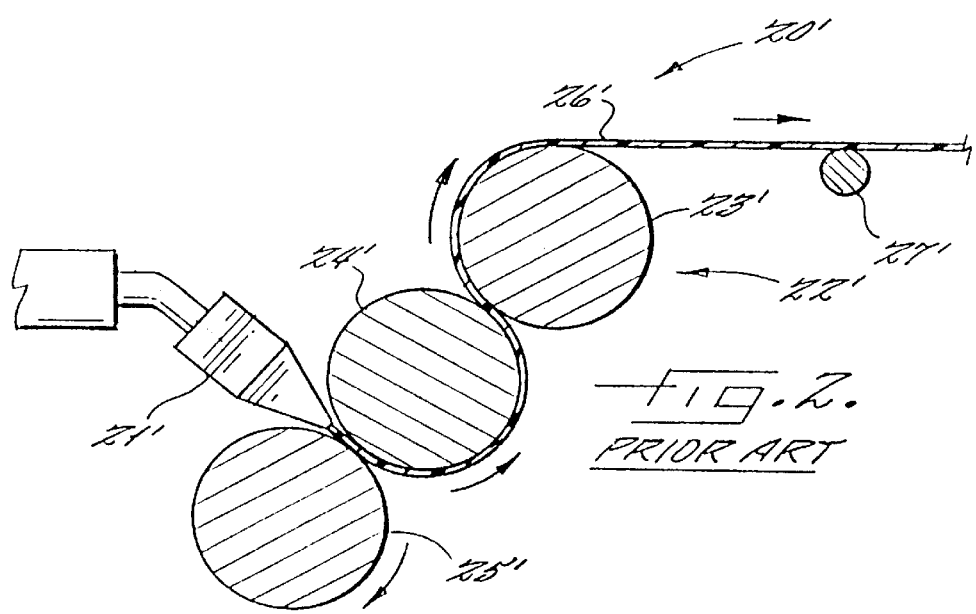
FIG. 2 is a schematic side cross-sectional view of another embodiment of an apparatus for making a lenticular screen in accordance with the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Thicknesses of layers are exaggerated for clarity. Like numbers refer to like elements throughout.

Referring initially to FIGS. 3–7, the apparatus 40 for making a lenticular screen is first described. The apparatus 40 includes a rotating lenticular pattern forming roll 44 downstream from an extruder 41, and a conveyor belt 47 for pressing the hot plastic sheet 46 against the lenticular pattern forming roll to thereby form the lenticular pattern in the hot plastic sheet. The apparatus 40 preferably includes tension adjusting means for adjusting a tension of the conveyor belt 47 to thereby adjust a pressure applied to the hot plastic sheet. In addition, the apparatus 40 preferably further comprises contact adjusting means cooperating with the conveyor belt for adjusting a length of contact of the hot plastic sheet 46 around a periphery of the rotating lenticular pattern forming roll 44. Accordingly, the dwell time of the hot plastic sheet 46 on the lenticular pattern forming roll 44 can be controlled, along with the pressure applied to the hot plastic sheet. The pressure and dwell time provide an improved quality of the reproduction of the lenticular pattern in the plastic sheet 46. In addition, the dwell time can be longer or shorter depending on the properties of the plastic material, its thickness, the pattern to be transferred, and the desired speed of the plastic sheet as would be readily understood by those skilled in the art.

As shown in the illustrated embodiment, the lenticular pattern forming roll 44 is preferably a chill roll for receiving a cooling fluid therethrough to cool the hot plastic sheet 46. The cooling fluid may be a liquid, such as water, for example, or may be a gas as would be readily appreciated by those skilled in the art. The cooling fluid is supplied by the schematically illustrated cooling fluid source 50.

Figure 3:
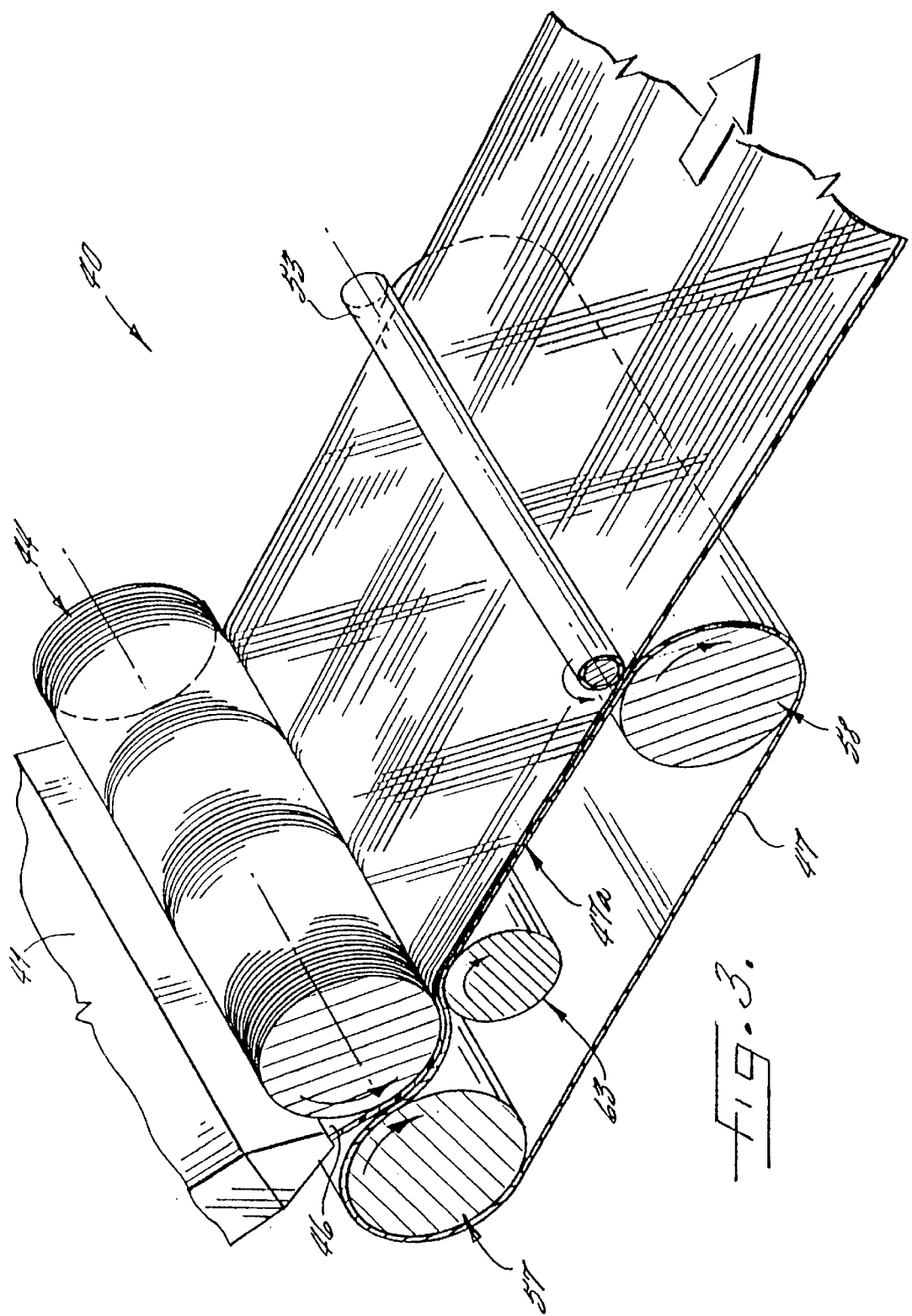
FIG. 3 is a perspective view of an apparatus for making a lenticular screen in accordance with the present invention.
Figure 4:
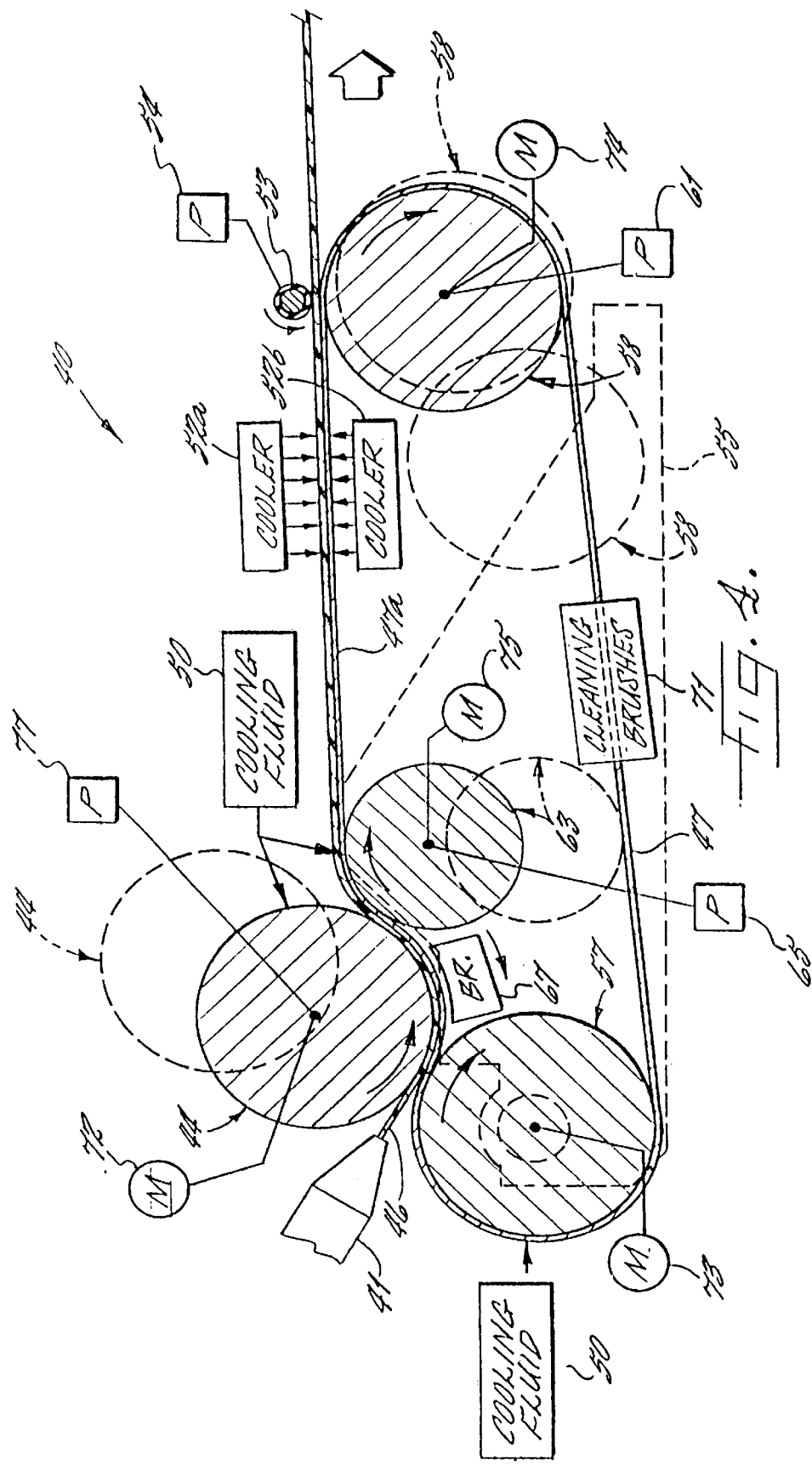
FIG. 4 is a schematic side cross-sectional view of the apparatus as shown in FIG. 3 with several additional details being illustrated.

The conveyor belt 47 may also be configured to include a flat portion 47a downstream from the rotating lenticular pattern forming roll 44 as perhaps best shown in FIGS. 3 and 4. Accordingly, the flat conveyor belt portion 47a provides a flat surface during secondary cooling of the hot plastic sheet 46 after the lenticular pattern is formed and readily allows for material shrinkage without imparting undesirable stress to the plastic. Cooling means may also be positioned adjacent the flat portion 47a of the conveyor belt for further cooling the hot plastic sheet 46, and/or the belt and sheet. In the illustrated embodiment, an upper cooler 52a may direct cooling air onto the plastic sheet 46, and while the lower cooler directs air upward onto the back side of the conveyor belt 47 as would be readily understood by those skilled in the art. The air coolers could be replaced by water or other heat exchangers as would be understood by those skilled in the art. The time/temperature profile of cooling may be thus readily controlled to ensure a high quality lenticular screen.

Also relating to handling of the sheet 46 during cooling, the apparatus 40 illustratively includes at least one passive sheet guide roll 53 positioned opposite the conveyor belt 47 and downstream from the lenticular pattern forming roll 44 to guide the hot plastic sheet on the conveyor belt without imparting undesirable tension to the sheet, in contrast to the conventional puller rolls 28 (FIG. 1). The illustrated passive guide roll 53 is a rubber coated roll, although those of skill in the art will recognize that other types and compositions of rolls may also be used. The passive guide roll 53 may be positioned by a positioner 54, such as may be provided by swing-arms and pneumatic cylinders, or other arrangements with linear motion and hydraulics or mechanical positioning as would be readily understood by those skilled in the art. The passive guide roll 53 is positioned over the second belt support roll 58 so that the sheet 46 is pulled from the apparatus 40 along a line parallel to the flat conveyor belt portion 47a. The passive guide roll 53 is only driven by the friction between itself, the plastic sheet 46 and the belt 47. Pressure on the passive guide roll 53, to ensure sufficient friction, can be applied mechanically or by pneumatic or hydraulic cylinders as would be readily understood by those skilled in the art.

The pull caused by the passive guide roll 53, which is only driven by the friction between itself, the plastic sheet 46 and the belt 47 passing over the second belt support roll 58, will not cause as much tension as a conventional set of pull rolls. Accordingly, it will also be easier to keep control of the distances in the lenticular pattern, like the pitch of the lenticular lenses. Some tension will be imparted because the plastic sheet 46 will have a higher expansion coefficient than the material in the belt 47. Since the lenticular screen is a finished product as far as the plastic is concerned, less stress is preferred as would be readily understood by those skilled in the art.

The apparatus 40 includes a frame 55 (FIG. 4) carrying the lenticular pattern forming roll 44, a first belt support roll 57 positioned adjacent the lenticular pattern forming roll, and a second belt support roll 58 spaced from the first belt support roll. The first belt support roll 57 is illustratively fixed, but could be mounted such as to be movable. For example, the first belt support roll 57 could also be mounted to move horizontally to give sufficient distance in front of the nip with the lenticular pattern forming roll 44 so that a plastic web could be entered for extrusion coating with tie-layers and resin, or only resin, and which thereafter is contacted by the lenticular pattern forming roll.

A positioner 61 may be associated with the second belt support roll 58 for adjusting a tension of the conveyor belt 47 as would be readily appreciated by those skilled in the art. For example, the positioner 61 may be hydraulic, pneumatic, or electrically operated as would be understood by those skilled in the art without further explanation herein.

The apparatus 40 also illustratively includes a third belt support roll 63 carried by the frame 55 and positioned adjacent the lenticular pattern forming roll 44 and between the first and second belt support rolls 57, 58, respectively. Accordingly, another positioner 65 may be associated with the third belt support roll 63 for adjusting a length of contact of the hot plastic sheet 46 around a periphery of the rotating lenticular pattern forming roll 44. The positioner 65 may include swing arms and motorized screws, but mechanical guides like curved or straight linear guides and other mechanical means for positioning that provide the same functions are also contemplated by the present invention. Considered in somewhat different terms, control of the position of third roll 63 provides one embodiment for adjusting the contact time and extent of the hot plastic sheet 46 on the lenticular pattern forming roll 44. Those of skill in the art will appreciate that the relative positioning of the first belt support roll 57, the lenticular pattern forming roll 44, and the third roll 63 define the contact of the hot plastic sheet 46 with the lenticular pattern forming roll.

One or more additional bearings 67 may be provided to press the underside of the conveyor belt 47 and thereby press the plastic sheet 46 against the lenticular pattern forming roll 44 (FIG. 4). For special applications where continued high pressure higher than the tensioning of the belt 47 can apply, an arrangement with needles, such as needle bearings, may be positioned between the conveyor belt and a pad or several pads, not shown, as wide as the belt, but relatively short in the machine direction, onto which pressure can be applied by hydraulic cylinders as would also be understood by those skilled in the art.

In addition, the second and third belt support rolls 58, 63 are also preferably arranged to define the flat conveyor belt portion 47a downstream from the rotating lenticular pattern forming roll 44, and the flat portion may be horizontally oriented as shown in the illustrated embodiment. In other embodiments, the roll may be oriented so that the flat conveyor portion 47a is at other angles as will be readily appreciated by those skilled in the art.

The conveyor belt 47 itself preferably has a relatively smooth surface to thereby form a correspondingly smooth surface on the reverse side of the plastic sheet 46. In one embodiment, the conveyor belt 47 may comprise a metal fabric, such as formed of stainless steel or titanium, for example, and as would be readily appreciated by those skilled in the art. The conveyor belt 47 is preferably seamless and continuous with sufficient hardness and strength for carrying the plastic sheet 46 and applying the desired pressure thereto as would be understood by those skilled in the art. Polished, hard and corrosion resistant belts are today used in other industrial processes like wood chip board production, for example, and are therefore readily available.

One or more brushes 71 may be positioned to clean the surface of the belt 47 as would also be readily appreciated by those skilled in the art. A vacuum arrangement, not shown, may also cooperate with the brush 71 to clean the belt 47. The length of the belt 47, if kept clean will ensure a relatively long life compared to conventional polishing rolls, for example.

Some or all of the rolls 44, 57, 58 and 63 may be driven by electric motors 72, 73, 74 and 75, respectively, as schematically illustrated in FIG. 4. In other embodiments, some of the rolls may be passively driven as will also be readily appreciated by those skilled in the art. As depicted in the illustrated embodiment, a positioner 77 may be operatively connected to the lenticular pattern forming roll 44 to control its relatively position, such as to move it between engaged and retracted positions. The positioner 77 may include swing arms and associated hydraulic cylinders, for example, but other arrangements with linear guides, and/or pneumatic or mechanical positioning are also contemplated by the present invention.

The outer surfaces of the rolls 57, 58 and 63 may preferably be hardened for durability. These rolls are desirably ground parallel within the tolerances normal for the plastic extrusion industry, but do not necessary need to have a fine surface as provided by polishing. Instead, their surface roughness will somewhat depend on the hardness and thickness of the belt 47. The rolls 57, 58 and 63 and any other rolls that will be in contact with the back of the belt 47 will be cheaper to manufacture, because they do not need the true mirror surface required in conventional polishing stacks. For enhanced friction, the first and second belt support rolls 57, 58 and/or the third belt support roll 63 may be coated with a hard polyurethane rubber or other appropriate rubber material.

The apparatus 40 offers a number of important advantages including easy start-up, since no supporting reproduced sheet has to be thread trough the machine prior to starting the extruder 41. With the lenticular pattern forming roll 44 in a retracted position and with the belt 47 tensioned, one can start extruding onto the belt over the first belt support roll 57 and when the flow is even enough, the lenticular pattern forming roll 44 may be moved into the engaged position along with appropriate repositioning of the second and third belt support rolls 58, 63.

The nip between the lenticular pattern forming roll 44 and the first belt support roll 57 with the belt 47 function as the beginning of the nip, and, thereafter, the belt ensures proper holding and pressure for the plastic sheet 46. The enclosed almost chamber-like arrangement for the plastic sheet 46 is kept for an adjustable period after entering the nip and improves the reproduction of the pattern, minimizes local gage variations, and gives better control of the cooling of the sheet. The line speed can be faster and allow for a higher production rate than would be otherwise possible given the same thickness and kind of material being processed using a conventional polishing stack.

One method aspect of the present invention is for making a screen having a predetermined pattern thereon, such as for making a lenticular pattern when using a lenticular pattern forming roll 44. The method preferably comprises the steps of: extruding a hot plastic sheet 46; positioning a rotating pattern forming roll 44 downstream from the extruder 41; and using a conveyor belt 47 for pressing the hot plastic sheet from the extruder against the pattern forming roll to form a pattern in the hot plastic sheet.

The method also preferably further comprises the steps of: adjusting a tension of the conveyor belt 47 to thereby adjust a pressure applied to the hot plastic sheet 46, and/or adjusting a length of contact of the hot plastic sheet around a periphery of the rotating pattern forming roll 44. The method may also include the step of configuring the conveyor belt to include a flat portion 47a downstream from the rotating pattern forming roll and providing a flat surface during cooling of the hot plastic sheet 46 after the pattern is formed therein. Accordingly, the plastic sheet 46 may be formed to be relatively flat as is desirable for many applications.

Referring now more particularly to FIGS. 5–7 another aspect of the invention is explained. The first belt support roll 57 may be a chill roll comprising a tubular body 57a through which the cooling fluid is passed. In addition, the third belt support roll 63 may also be a chill roll comprising a tubular body 63a through which cooling fluid is also passed as would be readily understood by those skilled in the art. Of course, in other embodiments either or both of these rolls may not need the cooling fluid.

As shown in FIGS. 5 and 6, the lenticular pattern forming roll 44 may comprise a tubular body defining a chill roll 44a and a lenticular sleeve 44b positioned on the chill roll. The lenticular sleeve 44b has a lenticular pattern formed on an outer surface for forming the corresponding lenticular pattern in the plastic sheet 46. The sleeve 44b may be readily manufactured and transported to a desired location to be installed on the chill roll 44a. The lenticular sleeve 44b may also be removed from the chill roll 44a and transported for resurfacing and without requiring transporting of the entire chill roll. Accordingly, considerable savings may be realized. In addition, a spare sleeve 44b may be maintained in inventory in the manufacturing facility to thereby reduce downtime as would be readily understood by those skilled in the art.

The lenticular sleeve 44b may preferably comprise a nickel-phosphorous composition defining at least a radially outermost portion of the sleeve in which the lenticular pattern is formed. More particularly, the nickel-phosphorous composition is preferably an amorphous nickel-phosphorous composition comprising nickel in a range of about 75 to 86 percent by weight, and phosphorous in a range of about 14 to 25 percent by weight. This material is durable in use, yet the lenticular pattern is readily formed in the composition using conventional diamond cutting techniques as will be described in greater detail below. As would be readily understood by those skilled in the art, the nickel-phosphorous composition may be formed by electrodepositing or electroless depositing, for example.

The interior surface of the lenticular sleeve 44b may have a predetermined diameter to frictionally engage an adjacent exterior surface of the chill roll 44a. The interior surface of the lenticular sleeve 44b may also have a predetermined surface roughness to frictionally engage the adjacent exterior surface of the chill roll 44a. When using the nickel-phosphorous composition, the interior surface of the lenticular sleeve 44a may preferably have a coefficient of friction of at least about 0.1.

Figure 9:
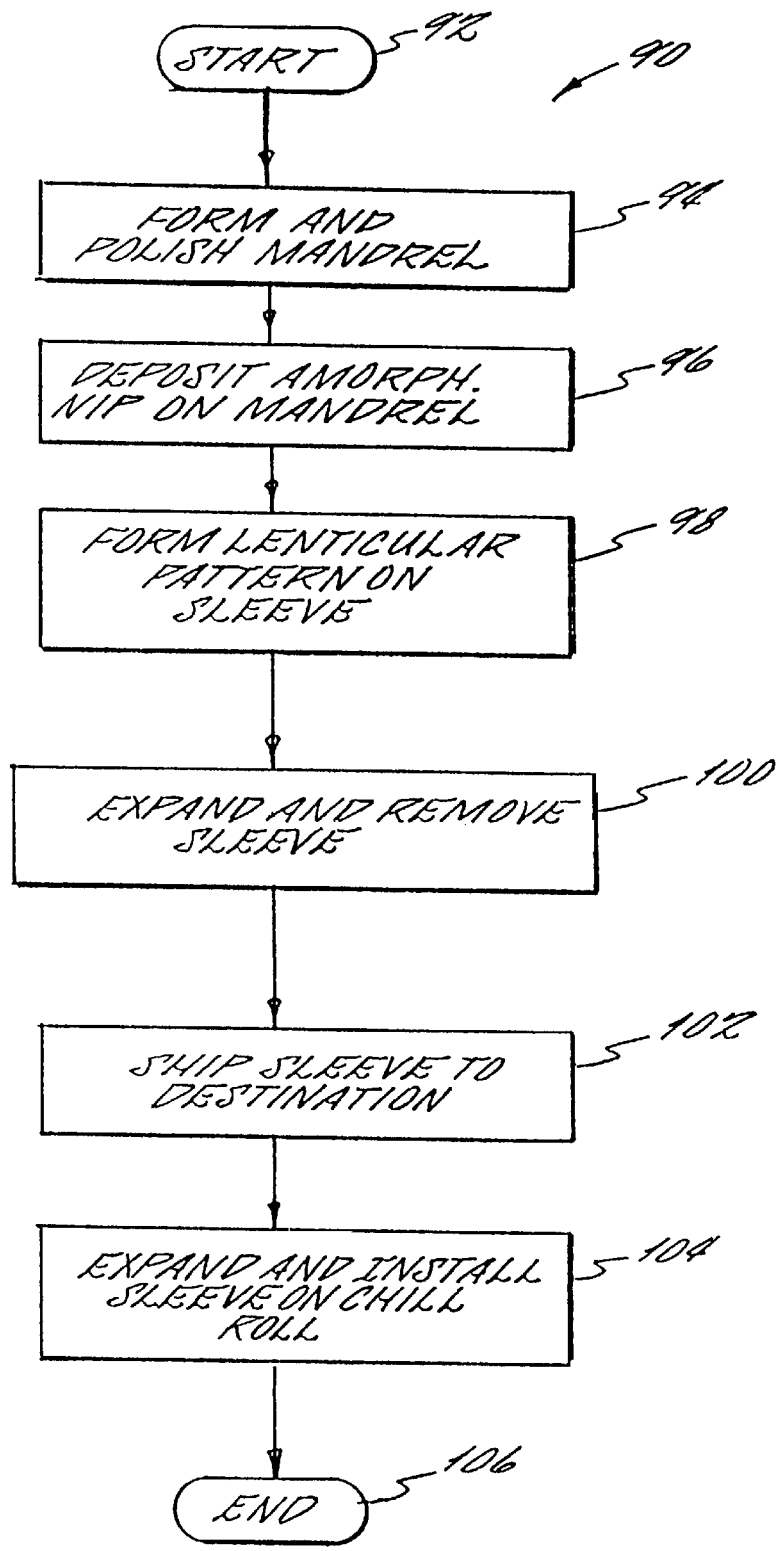
FIG. 9 is a flowchart of the method steps for making the lenticular pattern forming roll in accordance with the present invention.

One method aspect of the invention is for making a lenticular pattern forming roll 44 for forming a lenticular screen as is explained with reference to FIGS. 8A–8E and the flowchart 90 of FIG. 9. From the start at Block 92, the outer surface of a mandrel 80 is prepared, such as by polishing to define a desired surface (FIG. 8A). The amorphous nickel-phosphorous metal layer 81 is deposited onto the mandrel 80 using either an electroless or electrodeposition technique as would be readily appreciated by those skilled in the art. At Block 98 and as shown schematically in FIG. 8C, the lenticular pattern is cut into the outer surface of the metal layer 81 by the illustrated diamond cutter 84 while on the mandrel 80 to form the lenticular sleeve 44b. At Block 100, the thus formed lenticular sleeve 44b is removed or freed from the mandrel as shown in FIG. 8D. The lenticular sleeve 44b may be freed from the mandrel 80 by the injection of air or another fluid into the interface between the sleeve and mandrel. Alternately, a difference in coefficients of thermal expansion may be used to separate the sleeve and mandrel as would be readily appreciated by those skilled in the art. In other words, cooling or heating may be used to separate the sleeve 44b from the mandrel 80.

The lenticular sleeve 44b may typically be shipped to the location making the lenticular screen as set forth in Block 102. Because of the relatively high cost of the capital equipment for forming the lenticular pattern, the forming or a similar refinishing process is likely to only be performed at certain locations suitably equipped as would be understood by those skilled in the art. The lenticular sleeve 44b may be installed onto the chill roll 44a (Block 104) as shown in FIG. 8E before the process ends (Block 106).

The step of installing the lenticular sleeve 44b onto the chill roll 44a may also be aided by the injection of air or other fluid into the interface between the sleeve and chill roll. Alternately, heating may be used to first expand the sleeve prior to positioning on the chill roll. The chill roll may also be reduced in size or contracted by cooling. In other words, the freeing may be based upon a difference in coefficients of thermal expansion between the sleeve 44b and the chill roll 44a. Of course, the sleeve 44b may also be removed from the chill roll 44a to facilitate changing to a new lenticular pattern or to permit refinishing of the lenticular sleeve 44b as would be appreciated by those skilled in the art.

The lenticular sleeve 44b can also be secured to the chill roll 44a using a hot-melt adhesive, for example, and with a suitable melting point so that the sleeve will not separate when being used for forming the lenticular screen as will be readily appreciated by those skilled in the art. Another form of an adhesive bond make be provided by a low melting temperature solder metal or alloy applied to one or both of the outer surface of the chill roll 44a and the inner surface of the sleeve 44b. By heating the sleeve and roll assembly to the appropriate temperature and keeping the sleeve 44b in the proper position while cooling the assembly below the melting point of the adhesive or solder, the sleeve can be fixed to the chill roll 44a with very high strength. In both examples, of course, the sleeve can be removed by reheating the assembly to the appropriate melting temperature as would be readily understood by those skilled in the art.

Nickel alloys may be especially suitable for cutting using single crystal diamond. Adequate machinery for cutting in an amorphous nickel-phosphorous composition with properly prepared single crystal diamonds can allow for a relatively large areas with a predetermined surface roughness of less than RMS 10 Å. Cutting of optical surfaces and forms with single crystal diamonds is relatively well known by those skilled in the art, and requires no further discussion herein.

The inventor of the present invention previously developed chemistry and methods for making relatively thick deposits (50 to 500 micron) of amorphous nickel-phosphorous with 13 to 15% phosphorous content (by weight) by electroless depositing. At present, amorphous nickel-phosphorous compositions with even higher phosphorous content can also be deposited by electrodepositing as would be readily understood by those skilled in the art. Although the mechanism is not entirely understood, tool wear is minimized when the phosphorus content of the deposit is greater than about 11% (by weight). Accordingly, the nickel-phosphorous has good lubricating properties which makes it well suited for tools used in the forming of plastics.

Both the electroless and electrodeposited nickel-phosphorous alloys can be used for the lenticular sleeve 44b, but the electrodeposited may have some advantages. Electrodeposition may be at a rate of up to 60 microns per hour and a phosphorous content of higher than about 15% can be obtained.

Another advantage of the electrodeposited nickel-phosphorous composition is the consistently higher density as compared to the electroless deposited material. It is believed without applicant being bound thereto that the electrodeposited nickel-phosphorous alloys contain a lower void volume than the electroless deposited alloys, that is, the nickel and phosphorous are more closely packed. This reduces the porosity in the plated deposit and is of particular interest for diamond machining applications since it potentially leads to fewer micro defects in the material being machined, thereby resulting in improved surface finish. In addition, electrodeposited Ni—P can have a hardness of Rockwell C 45–51 as deposited, and by heat treatment can reach a hardness of Rockwell C 70–72. This hardness range is sufficient to obtain a lenticular sleeve 44b with a relatively long service life.

There are several configurations of the lenticular pattern forming roll 44 including the lenticular sleeve 44b. For example, a cylindrical sleeve portion may be produced by depositing 100% nickel onto the mandrel 80, depositing required thickness of nickel-phosphorous alloy and cutting the lenticular pattern into the outer layer with diamonds. Of course, the entire sleeve 44b may be formed either by the electroless depositing or electrodepositing of the nickel-phosphorous onto the mandrel 80, and thereafter the sleeve is given a lenticular pattern by cutting with diamonds.

In other embodiments, a base portion of the sleeve 44b may be produced by electrodepositing the nickel-phosphorous onto the mandrel 80, another metal or metal alloy suited for cutting with diamonds is deposited onto the base portion, and the lenticular pattern is cut into the other metal or alloy with diamonds. Similarly, the base portion of the sleeve 44b may be produced by electrodepositing nickel onto the mandrel 80, another metal or metal alloy suited for cutting with diamonds is deposited onto the base portion, and the lenticular pattern is cut into the other metal or alloy with diamonds.

In yet another embodiment, a cylindrical sleeve for fitting by expansion onto a suitable roll is produced by hot or cold rolling from a ring produced by casting and/or machining of a metal or alloy suited for cutting with diamonds. Alternately, the metal or alloy suited for cutting with diamonds is deposited onto the underlying cylindrical sleeve, thereafter the lenticular pattern is cut in the outer surface with diamonds.

Figure 10A:
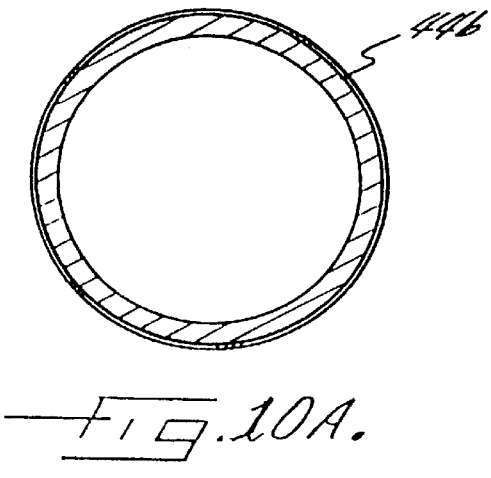
FIGS. 10A–10D are cross-sectional views illustrating conversion of the lenticular sleeve into a flat lenticular form in accordance with the invention.
Figure 10B:
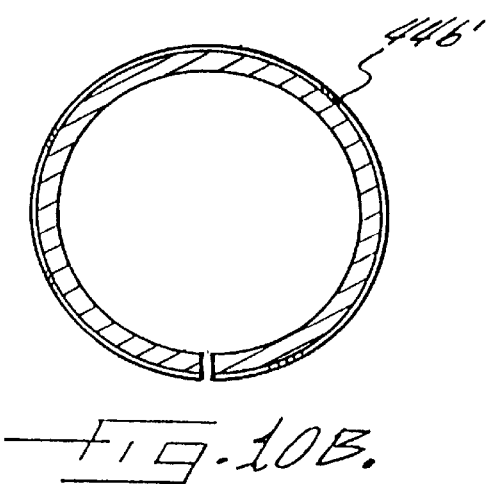
Figure 10C:
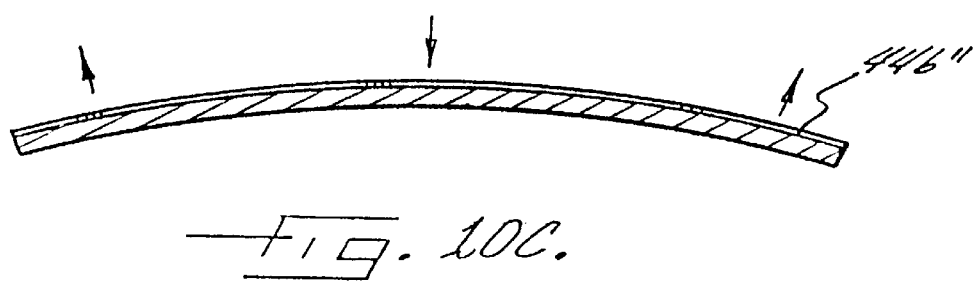
Figure 10D:
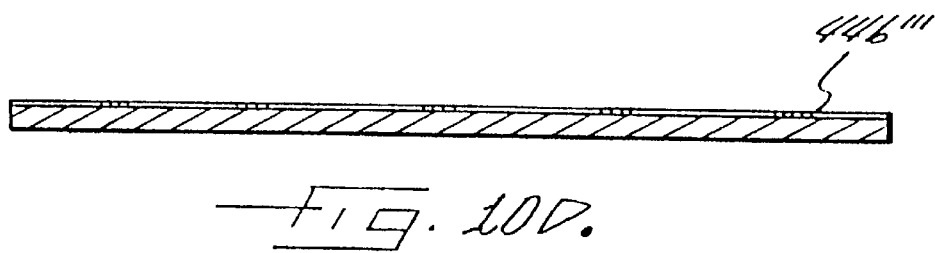

According to another aspect of the invention and as shown with additional reference to FIGS. 10A–10D, the lenticular sleeve 44b (FIG. 10A) can be split or cut axially to produce the structure 44a' shown in FIG. 10B, then straightened to the intermediate structure 44" shown in FIG. 10C, to finally become a flat form structure 44'" as shown in FIG. 10D to be used for casting, injection molding or thermoforming of lenticular screens. Flat lenticular forms have traditionally been cut into sheets, which can be both difficult and costly. In contrast, the axial splitting of the lenticular sleeve 44b in accordance with the invention can provide a flat lenticular form 44'" relatively easily and economically.

As long as the outer or mantel surface of the chill roll 44a, to be used with the lenticular sleeve 44b is not damaged in any way, the roll itself need not be resurfaced when the lenticular sleeve is exchanged. Many different lenticular screens are commonly desired and the ability to reuse the same chill roll 44a (or a pair for speedy exchange) enable more economical production of shorter runs, and allow for special lenticular lenses, as compared to dedicated rolls with the lenticular pattern in the outer surface. The cutting of the lenticular pattern may also take place on extremely accurate machines in accordance with the invention. The lenticular sleeve 44b enables less weight to be manipulated during cutting as would be readily appreciated by those skilled in the art. Less weight to be handled during cutting results in one or both of easier cutting and higher accuracy.

The following table, formulas, derivations and calculations show that it is possible for the nickel-phosphorous lenticular sleeve 44b to be fitted onto a chill roll 44a to produce a lenticular pattern forming roll 44 that can fill the requirements for use in production of plastic sheet and film:

The properties of the electrodeposited Ni—P are as follows:

| Properties: | Typical Value: |
| --- | --- |
| Composition | 75–86% N:, 14–25% P |
| Coefficient of Friction | 0.13 |
| Corrosion Resistance | 1000+ hours @ .001" |
| Neutral Salt Spray (ASTM B-117) | 500 hours @ .0003" |
| Copper Accelerated Salt Spray | 200+ hours @ .0003" |
| CASS (ASTM B-368) | Unlimited exposure without attack |
| RCA Nitric Acid Test | None |
| Thickness Constraints | |
| Hardness | |
| As Deposited | Rockwell C 45-51 |
| Bake 590° F./3 hours | Rockwell C 63-66 |
| Bake 750° F./1 hour | Rockwell C 70-72 |
| Melting Point | 1630° F. |
| Density | 7.6 g/cm$^3$ (0.27 pounds/inch$^3$) |
| Internal Stress | None |
| Tensile strength | |
| As Deposited | –100 KSI |
| Heat Treated | –270 KSI |
| Ductility | |
| per ASTM Bend Test | 10%–15% elongation typ. |
| Wear Resistance | Comparable to Hard Chrome |

At 20° C., the roll diameter is D, and at temperature t, the roll diameter can be found from $Dt=D(1+\Delta T \text{ Coer})$, and $\Delta T=t-20$, where Coer is expansion coefficient of steel. A pull of 5,000 N (maximum) is needed for most of the known plastic materials when produced in a polishing stack or calendar. At temperature t, the sleeve 44b should apply a pressure of Pt to clamp sufficiently around the chill roll 44a for adequate friction between the sleeve and the chill roll. Pt is given below and where L is length of the sleeve, and f is coefficient of friction between the sleeve and the chill roll:

$$Pt = \frac{5,000/f}{\pi Dt \cdot L} = \frac{5,000}{\pi DLf} \quad <1>$$

$$2N\max = \int_0^\pi PtL \cdot \frac{Dt}{2} \cdot \sin\alpha \cdot d\alpha \quad <2>$$
$$= Dt \cdot L \cdot Pt$$

$$N\max = DtL \cdot \frac{Pt}{2} = \frac{5,000}{2\pi f \cdot L \cdot tm}$$

At temperature t, the maximum stress in the sleeve will be (Pt is also imparting stress to the sleeve, but that is small enough to be neglected) and tm is the thickness of Ni—P sleeve:

$$\sigma\max(t) = \frac{N\max}{L \cdot tm} = \frac{5{,}000}{2\pi f \cdot L \cdot tm}$$

Supposing now that the inside diameter of the sleeve at temperature t is dt, (when it is free), then the mean diameter will be dt+tm. Under a stress of σmax the sleeve will expand to an inside diameter of Dt, and a mean diameter of Dt+tm. The expanded length is, where E is Young's modulus of the sleeve:

$$\Delta Lt = \pi(Dt + tm) - \pi(dt + tm)$$
$$= \pi(Dt - dt)$$

but:

$$dt = d(1 + \Delta T\, Coes)$$
$$D = D(1 + \Delta T\, Coer)$$

$$\Delta Lt = \pi[(D - d + \Delta T(D \cdot Coer - d \cdot Coes)]$$
$$Lt = \pi(dt + tm)$$
$$= \pi[d(1 + \Delta TCoes) + tm]$$
$$\frac{\Delta Lt}{Lt} = \frac{\theta\max}{E}$$

$$\frac{D - d + \Delta T(D \cdot Coer - d\, Coes)}{d(1 + \Delta TCoes) + tm} = \frac{5{,}000}{2\pi f \cdot L \cdot tmE}$$

From the above equations, we can find the value of d. The pressure needed to expand the sleeve from an inside diameter of D+δ at 20° C.:

$$\Delta L = \pi(D + \delta - d)$$
$$L = \pi(d + tm)$$

δ is the gap needed for safely fitting the sleeve onto the chill roll.

$$\Delta L/L = \sigma/E$$
$$\sigma = \Delta L\, E/L = \frac{(D + \delta - d)}{d + tm} E$$

$$\sigma = \frac{N}{A} = \frac{1/2(D + \delta) \cdot L \cdot P}{d + tm} = \frac{(D + \delta)P}{2tm}$$

$$\frac{(D + \delta)P}{2tm} = \frac{(D + \delta - d)E}{d + tm}$$

$$P = \frac{2tm(D + \delta - d)}{(D + \delta)(d + tm)} \cdot E$$

and wherein P is the air pressure needed to expand the sleeve.

Accordingly, the following table is based upon using the above equations and the following parameters: D=900 mm, E=2×10$^5$ Mpa, T=25 degrees Celsius (That is t=45 degrees Celsius, for ample applications), L=800 mm, f=0.1, and δ=0.1.

| tm (mm) | d (mm) | P (N/mm$_2$) | (N/mm$_2$) |
|---|---|---|---|
| 0.15 | 899.657 | 0.0328 | 98.4 |
| 0.20 | 899.731 | 0.0364 | 81.9 |
| 0.25 | 899.776 | 0.040 | 72.0 |
| 0.30 | 899.806 | 0.044 | 66.0 |
| 0.35 | 899.827 | 0.047 | 60.4 |
| 0.40 | 899.843 | 0.051 | 57.4 |
| 0.45 | 899.856 | 0.054 | 54.0 |
| 0.50 | 899.865 | 0.058 | 52.2 |

The stress inside the nickel-phosphorous sleeve σ is always much less than the tensile strength, that is, σb=100 KSI ~270 KSI, ie, σb=689.5 N/mm$^2$ ~1861.6 N/mm$^2$.

The apparatus 40 and the process can also be used for improved embossing of other kinds of patterns or even for reproduction of shallow forms into plastic sheets which in a secondary operation can be die-cut into single elements, for example. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A lenticular pattern forming roll for forming a lenticular screen, said lenticular pattern forming roll comprising:
   a chill roll having a generally cylindrical shape and for accepting a cooling fluid therethrough; and
   a lenticular sleeve positioned on said chill roll, said lenticular sleeve comprising a nickel-phosphorous composition and having a lenticular pattern formed on an outer surface thereof for forming a corresponding lenticular pattern in a plastic sheet passed adjacent thereto.

2. A lenticular pattern forming roll according to claim 1 wherein said nickel-phosphorous composition defines at least a radially outermost portion in which said lenticular pattern is formed.

3. A lenticular pattern forming roll according to claim 1 wherein said nickel-phosphorous composition is an amorphous nickel-phosphorous composition.

4. A lenticular pattern forming roll according to claim 1 wherein said nickel-phosphorous composition comprises at least about 75 percent nickel by weight.

5. A lenticular pattern forming roll according to claim 1 wherein said nickel-phosphorous composition comprises less than about 86 percent nickel by weight.

6. A lenticular pattern forming roll according to claim 1 wherein said nickel-phosphorous composition comprises at least about 14 percent phosphorous by weight.

7. A lenticular pattern forming roll according to claim 1 wherein said nickel-phosphorous composition comprises less than about 25 percent phosphorous by weight.

8. A lenticular pattern forming roll according to claim 1 wherein said nickel-phosphorous composition is an electrodeposited nickel-phosphorous composition.

9. A lenticular pattern forming roll according to claim 1 wherein said nickel-phosphorous composition is an electroless deposited nickel-phosphorous composition.

10. A lenticular pattern forming roll according to claim 1 wherein said nickel-phosphorous composition has a Rockwell C hardness of at least about 45.

11. A lenticular pattern forming roll according to claim 1 wherein an interior surface of said lenticular sleeve has a predetermined diameter relative to an outer diameter of an adjacent exterior surface of said chill roll to frictionally engage same.

12. A lenticular pattern forming roll according to claim 1 wherein an interior surface of said lenticular sleeve has a predetermined surface roughness to frictionally engage an adjacent exterior surface of said chill roll.

13. A lenticular pattern forming roll according to claim 12 wherein said predetermined surface roughness of said lenticular sleeve has a coefficient of friction of at least about 0.1.

14. A lenticular pattern forming roll according to claim 1 further comprising an adhesive layer between an interior surface of said lenticular sleeve and an adjacent surface of said chill roll.

15. A lenticular pattern forming roll according to claim 14 wherein said adhesive layer comprises at least one of a meltable adhesive and a meltable solder.

16. A lenticular pattern forming roll for forming a lenticular screen, said lenticular pattern forming roll comprising:
   a chill roll having a generally cylindrical shape and for accepting a cooling fluid therethrough; and
   a lenticular sleeve positioned on said chill roll in frictional engagement therewith, said lenticular sleeve having a lenticular pattern formed on an outer surface thereof for forming a corresponding lenticular pattern in a plastic sheet passed adjacent thereto, said lenticular sleeve comprising a nickel-phosphorous composition defining at least a radially outermost portion of said sleeve in which said lenticular pattern is formed.

17. A lenticular pattern forming roll according to claim 16 wherein said nickel-phosphorous composition is an amorphous nickel-phosphorous composition.

18. A lenticular pattern forming roll according to claim 16 wherein said nickel-phosphorous composition comprises nickel in a range of about 75 to 86 percent by weight, and phosphorous in a range of about 14 to 25 percent by weight.

19. A lenticular pattern forming roll according to claim 16 wherein said nickel-phosphorous composition is an electrodeposited nickel-phosphorous composition.

20. A lenticular pattern forming roll according to claim 16 wherein said nickel-phosphorous composition is an electroless deposited nickel-phosphorous composition.

21. A lenticular pattern forming roll according to claim 16 wherein said nickel-phosphorous composition has a Rockwell C hardness of at least about 45.

22. A lenticular pattern forming roll according to claim 16 wherein an interior surface of said lenticular sleeve has a predetermined diameter relative to an outer diameter of an adjacent exterior surface of said chill roll to frictionally engage same.

23. A lenticular pattern forming roll according to claim 14 wherein an interior surface of said lenticular sleeve has a predetermined surface roughness to frictionally engage an adjacent exterior surface of said chill roll.

24. A lenticular pattern forming roll according to claim 23 wherein said predetermined surface roughness of said lenticular sleeve has a coefficient of friction of at least about 0.1.

25. A lenticular pattern forming roll according to claim 16 further comprising an adhesive layer between an interior surface of said lenticular sleeve and an adjacent surface of said chill roll.

26. A lenticular pattern forming roll according to claim 25 wherein said adhesive layer comprises at least one of a meltable adhesive and a meltable solder.

27. A lenticular sleeve for positioning over a chill roll having a generally cylindrical shape for accepting a cooling fluid therethrough, said lenticular sleeve comprising:
   a tubular body comprising a nickel-phosphorous composition and having a lenticular pattern formed on an outer surface thereof for forming a corresponding lenticular pattern in a plastic sheet passed adjacent thereto.

28. A lenticular sleeve according to claim 27 wherein said nickel-phosphorous composition defines at least a radially outermost portion in which said lenticular pattern is formed.

29. A lenticular sleeve according to claim 27 wherein said nickel-phosphorous composition is an amorphous nickel-phosphorous composition comprising nickel in a range of about 75 to 86 percent by weight, and phosphorous in a range of about 14 to 25 percent by weight.

30. A lenticular sleeve according to claim 27 wherein said nickel-phosphorous composition has a Rockwell C hardness of at least about 45.

31. An apparatus for making a lenticular screen, said apparatus comprising:
   an extruder for extruding a hot plastic sheet; and
   a lenticular pattern forming roll downstream from said extruder, said lenticular pattern forming roll comprising:
      a chill roll having a generally cylindrical shape and for accepting a cooling fluid therethrough, and
      a lenticular sleeve positioned on said chill roll , said lenticular sleeve comprising a nickel-phosphorous composition and having a lenticular pattern formed on an outer surface thereof for forming a corresponding lenticular pattern in the plastic sheet passed adjacent thereto.

32. An apparatus according to claim 31 wherein said lenticular sleeve is frictionally engaged on said chill roll.

33. An apparatus according to claim 31 wherein said lenticular sleeve is adhesively secured on said chill roll.

34. An apparatus according to claim 31 wherein said nickel-phosphorous composition is an amorphous nickel-phosphorous composition comprising nickel in a range of about 75 to 86 percent by weight, and phosphorous in a range of about 14 to 25 percent by weight.

35. An apparatus according to claim 31 wherein said nickel-phosphorous composition has a Rockwell C hardness of at least about 45.

36. A method for making a lenticular pattern forming roll for forming a lenticular screen, the method comprising the steps of:
   providing a chill roll having a generally cylindrical shape for accepting a cooling fluid therethrough;
   providing a lenticular sleeve comprising a nickel-phosphorous composition and having a lenticular pattern on an outer surface thereof for forming a corresponding lenticular pattern in a plastic sheet passed adjacent thereto; and
   positioning the lenticular sleeve on the chill roll to define the lenticular pattern forming roll.

37. A method according to claim 36 wherein the step of providing the lenticular sleeve comprises the steps of:
   forming a metal layer on a mandrel;
   cutting the lenticular pattern in an outer surface of the metal layer while on the mandrel to form the lenticular sleeve; and
   freeing the lenticular sleeve from the mandrel.

38. A method according to claim 37 wherein the steps of forming, cutting, and freeing are performed remote from the chill roll; and further comprising the step of transporting the lenticular sleeve from the mandrel to the chill roll.

39. A method according to claim 37 wherein the step of freeing the lenticular sleeve from the mandrel comprises expanding the lenticular sleeve by injecting fluid between the mandrel and the lenticular sleeve.

40. A method according to claim 37 wherein the lenticular sleeve and the mandrel have different coefficients of thermal expansion; and wherein the step of freeing the lenticular sleeve from the mandrel comprises freeing same based upon the different coefficients of thermal expansion.

41. A method according to claim 37 wherein the step of forming the metal layer comprises forming the nickel-phosphorous composition.

42. A method according to claim 41 wherein the step of forming the nickel-phosphorous composition comprises forming an amorphous nickel-phosphorous composition comprising nickel in a range of about 75 to 86 percent by weight, and phosphorous in a range of about 14 to 25 percent by weight.

43. A method according to claim 41 wherein the step of forming the nickel-phosphorous composition comprises electrodepositing the nickel-phosphorous composition.

44. A method according to claim 41 wherein the step of forming the nickel-phosphorous composition comprises electrolessly depositing the nickel-phosphorous composition.

45. A method according to claim 41 further comprising the step of hardening the nickel-phosphorous composition to have a Rockwell C hardness of at least about 45.

46. A method according to claim 36 wherein the step of positioning the lenticular sleeve on the chill roll comprises frictionally engaging the lenticular sleeve onto the chill roll.

47. A method according to claim 36 further comprising the step of forming an interior surface of the lenticular sleeve to have a predetermined surface roughness to frictionally engage an adjacent exterior surface of the chill roll.

48. A method according to claim 36 wherein the step of positioning the lenticular sleeve on the chill roll comprises expanding the lenticular sleeve by injecting a fluid between the chill roll and the lenticular sleeve.

49. A method according to claim 36 wherein the lenticular sleeve and the chill roll have different coefficients of thermal expansion; and wherein the step of positioning the lenticular sleeve on the chill roll comprises positioning same based upon the different coefficients of thermal expansion.

50. A method according to claim 36 wherein the step of positioning the lenticular sleeve on the chill roll comprises securing the lenticular sleeve to the chill roll using a meltable adhesive.

51. A method for making a lenticular sleeve to be used in an apparatus for forming a lenticular screen, the apparatus including a chill roll having a generally cylindrical shape and for accepting a cooling fluid therethrough, the method comprising the steps of:

forming a metal layer comprising a nickel-phosphorous composition on a mandrel;

cutting a lenticular pattern in an outer surface of the metal layer while on the mandrel to form the lenticular sleeve; and freeing the lenticular sleeve from the mandrel.

52. A method according to claim 51 wherein the steps of forming, cutting, and freeing are performed remote from the chill roll.

53. A method according to claim 51 wherein the step of freeing the lenticular sleeve from the mandrel comprises expanding the lenticular sleeve by injecting fluid between the mandrel and the lenticular sleeve.

54. A method according to claim 51 wherein the lenticular sleeve and the mandrel have different coefficients of thermal expansion; and wherein the step of freeing the lenticular sleeve from the mandrel comprises freeing same based upon the different coefficients of thermal expansion.

55. A method according to claim 51 wherein the step of forming the metal layer comprises forming the nickel-phosphorous composition.

56. A method according to claim 55 wherein the step of forming the nickel-phosphorous composition comprises forming an amorphous nickel-phosphorous composition comprising nickel in a range of about 75 to 86 percent by weight, and phosphorous in a range of about 14 to 25 percent by weight.

57. A method according to claim 55 wherein the step of forming the nickel-phosphorous composition comprises electrodepositing the nickel-phosphorous composition.

58. A method according to claim 55 wherein the step of forming the nickel-phosphorous composition comprises electrolessly depositing the nickel-phosphorous composition.

59. A method according to claim 55 further comprising the step of hardening the nickel-phosphorous composition to have a Rockwell C hardness of at least about 45.

60. A method for making a body having a lenticular pattern thereon to be used for forming a lenticular screen, the method comprising the steps of:

forming a metal layer comprising a nickel-phosphorous composition on a mandrel;

cutting a lenticular pattern in an outer surface of the metal layer while on the mandrel to form a lenticular sleeve; and freeing the lenticular sleeve from the mandrel.

61. A method according to claim 60 further comprising the steps of:

slitting the lenticular sleeve; and flattening the slit lenticular sleeve to define a flat lenticular form.

62. A method according to claim 60 wherein the step of freeing the lenticular sleeve from the mandrel comprises expanding the lenticular sleeve by injecting fluid between the mandrel and the lenticular sleeve.

63. A method according to claim 60 wherein the lenticular sleeve and the mandrel have different coefficients of thermal expansion; and wherein the step of freeing the lenticular sleeve from the mandrel comprises freeing same based upon the different coefficients of thermal expansion.

64. A method according to claim 60 wherein the step of forming the metal layer comprises forming the nickel-phosphorous composition.

65. A method according to claim 64 wherein the step of forming the nickel-phosphorous composition comprises forming an amorphous nickel-phosphorous composition comprising nickel in a range of about 75 to 86 percent by weight, and phosphorous in a range of about 14 to 25 percent by weight.

66. A method according to claim 64 wherein the step of forming the nickel-phosphorous composition comprises electrodepositing the nickel-phosphorous composition.

67. A method according to claim 64 wherein the step of forming the nickel-phosphorous composition comprises electrolessly depositing the nickel-phosphorous composition.

68. A method according to claim 64 further comprising the step of hardening the nickel-phosphorous composition to have a Rockwell C hardness of at least about 45.

* * * * *